Aug. 6, 1968

G. E. BONIN 3,395,493

CUTTER FOR GLASS PIPE

Filed Aug. 26, 1965

INVENTOR.
George E. Bonin

BY

ATTORNEY

INVENTOR.
George E. Bonin

BY

ATTORNEY

United States Patent Office 3,395,493
Patented Aug. 6, 1968

3,395,493
CUTTER FOR GLASS PIPE
George E. Bonin, Addison, N.Y., assignor to Corning Glass Works, Corning, N.Y., a corporation of New York
Filed Aug. 26, 1965, Ser. No. 482,851
3 Claims. (Cl. 51—90)

ABSTRACT OF THE DISCLOSURE

Cutting apparatus for cutting lengths of pipe in the field including a support frame having a vise assembly for gripping the pipe, a rotatable cutting assembly for circumferentially cutting the pipe, and an adjustable support for maintaining the pipe to be cut, all positioned in a predetermined axial alignment along the support frame.

---

Tubing, such as industrial glass pipe, is manufactured and marketed in sizes of various diameters and in basic stock lengths. During installation, it is frequently necessary to install special non-stock lengths of this pipe in the field to avoid delaying the progress of the work. This entails cutting a piece of glass pipe to some shorter length, and it is essential that the cut be square or perpendicular to the longitudinal axis and without chips or cracks in the glass.

Presently known devices require numerous, tedious steps to cut such glass piping. The construction and bulk of these devices is such that the pipe must be cut in a shop and then transported to the field for assembly and use, this delaying the work. Some known glass cutters score the pipe, crack off a portion thereof, and then bead the cut end. This type of device requires additional equipment to provide a gas-oxygen flame for such crack-off and beading. A further disadvantage is inherent in these devices because the bead formed may not be of the correct size, thus requiring that the beading operation be redone.

Some presently known field cutters on the market cannot be used for high pressure fluid transport systems, mainly because they tend to produce incipient defects which would fail under the higher pressure buildup in such installations. Hot glass working in the field becomes too critical with respect to residual stresses because the temperatures and annealing of the glass must be carefully controlled. Further with strengthened glasses, the flame heating may remove some of the strengthening therein and it may be impossible to restrengthen this glass in the field.

Basically the present invention involves the use of a driven abrasive cutting wheel which is relatively moved around the pipe being cut on a circular track. Said track is mounted independently of the glass pipe, concentric with the centerline or longitudinal axis of such pipe, and approximately 90° to said centerline. If a required smoothness and flatness is not obtained in the original cut, the same wheel may be used as a facing tool to smooth and flatten the cut. A minimum degree of operator skill and training is required to operate the instant invention. The present device is of such proportions that it is easily transportable to locations where pipe cutoff for field installations can be made directly.

A preferred embodiment of the present invention set forth and described in detail in its simplest form comprises an adjustable vise assembly having a plurality of movable jaws for securely clamping a length of pipe which is being cut; a support assembly having an adjustable pipe rest; and a circular track assembly having a powered cutting unit attached thereto for parting the pipe into at least two portions.

In carrying out the invention to accomplish the improved result and novel advance in the art, a length of pipe which is to be parted is clamped in the vise assembly and borne by the support assembly. Thus the pipe is supported between the vise and support assemblies.

In a preferred embodiment, the circular track assembly is mounted between the vise and support assemblies so that it is 90° to the centerline of the mounted pipe and approximately concentric with the pipe. Thus when the powered cutting unit attached to the circular track assembly cuts into the pipe and thereafter orbits the pipe, a square and complete cut results which is perpendicular to the longitudinal axis of the pipe. The cut is at the same time and by the same means ground and finished so that an intermediate field installation may be made and the pipe fitting continued.

It thus has been an object of the present invention to provide a reliable and accurate cutter for glass pipe which may be used for field fabricating of a fluid transport system.

Another object of the present invention is to provide a cutter developing a square finished cut.

A further object of the present invention is to provide a cut which is flat and smooth so that a gasket seal may be provided between two portions of piping.

Another object of the present invention is to provide a glass cut with no uneven residual stresses or abrupt changes of stress in the glass.

Yet another object of the present invention is to provide a simple, straightforward apparatus for cutting and facing glass pipe which requires a minimum of operator training and skill.

An additional object of the present invention is to provide an apparatus for cutting a section of pipe without removing any strengthening from a strengthened-type of pipe.

Other and further objects, features and advantages will be apparent from the following description of presently preferred embodiments of the invention, given for the purpose of disclosure, and taken in conjunction with the accompanying drawings where like character references designate like parts throughout several views and where FIG. 1 is an elevational view in section of an adjustable clamp or vise assembly, a circular track assembly, and an adjustable support assembly incorporated within my invention.

Figure 2:
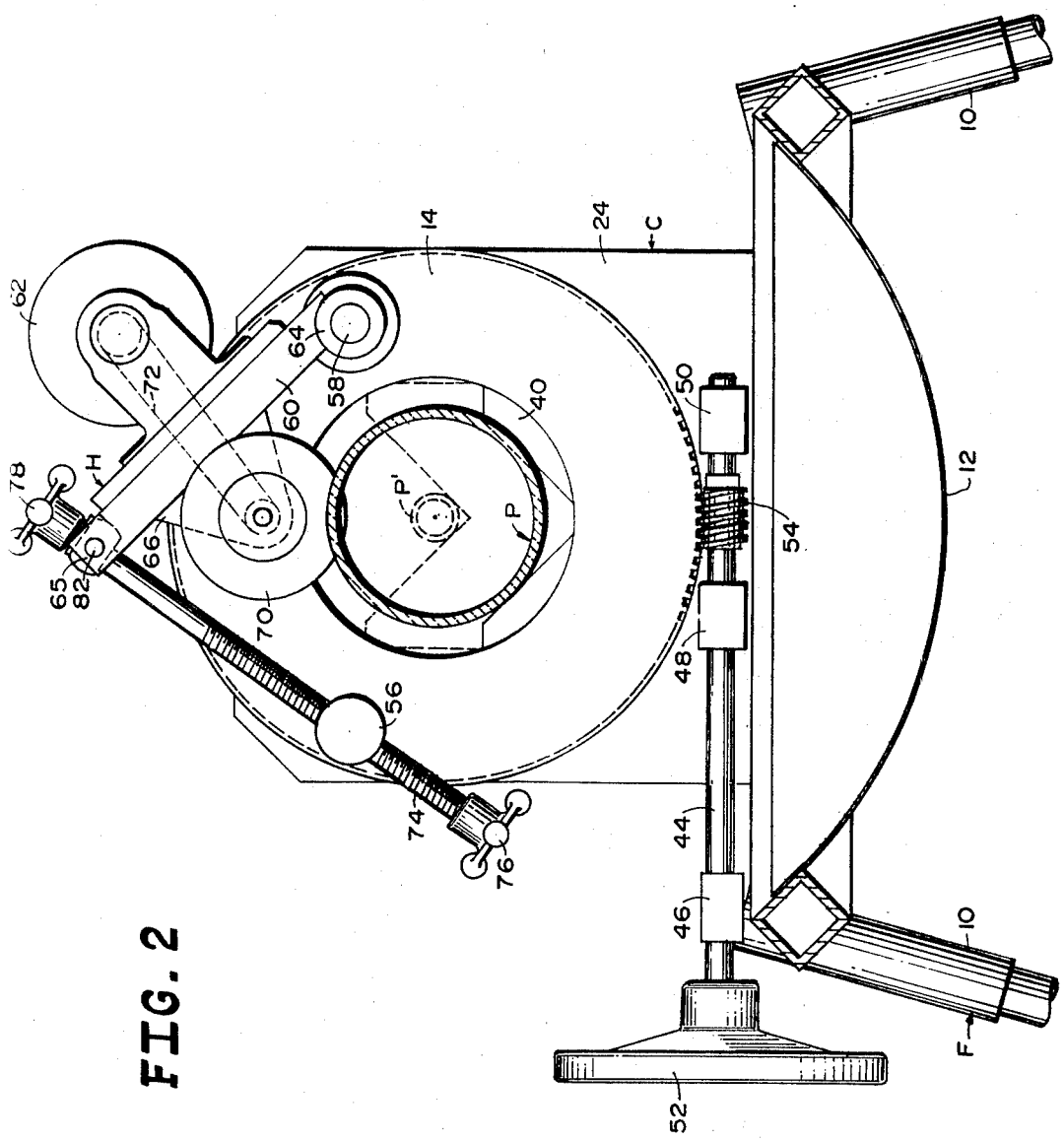
FIG. 2 is an elevational view of the cutting end, showing the circular track assembly and a powered cutting unit taken along line 2—2 of FIG. 1.
Figure 3:
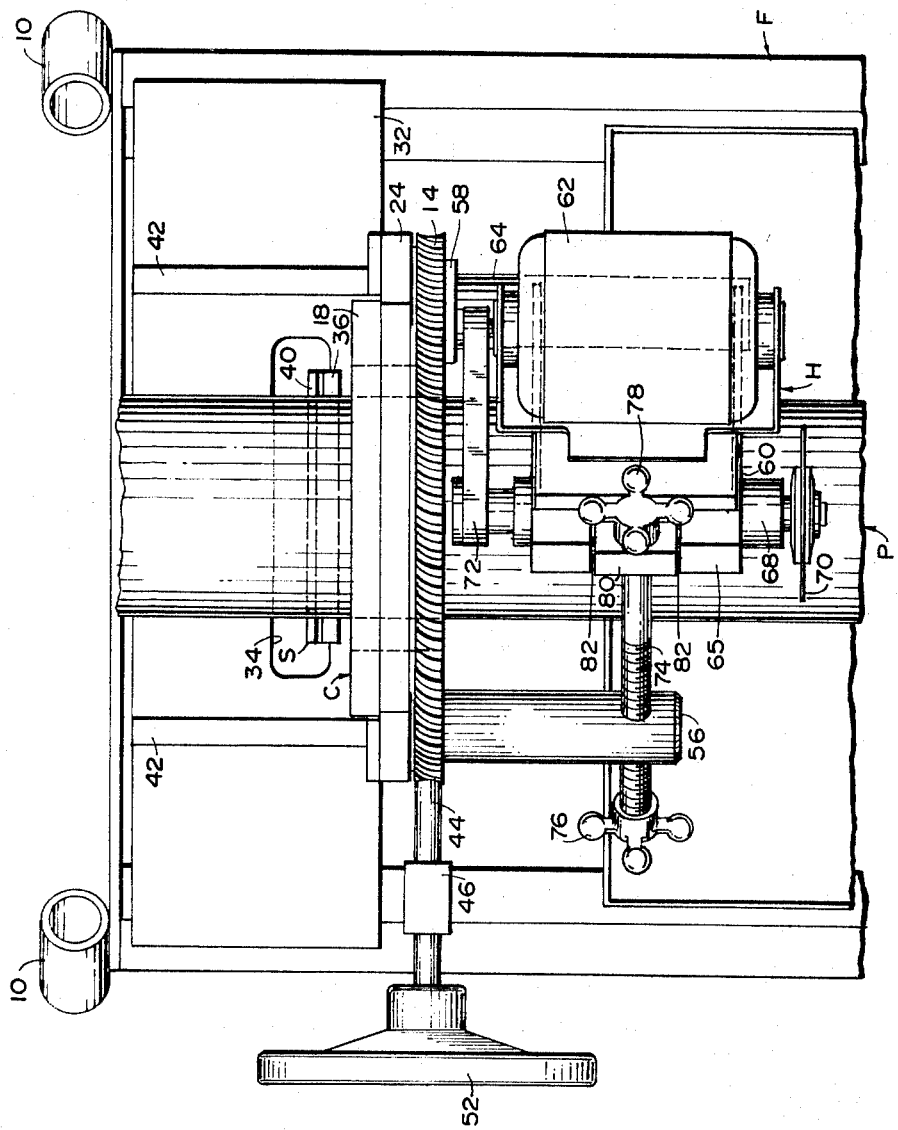
FIG. 3 is a partial plan view of the cutting end of my invention.

As shown in the drawings, the apparatus is composed of three main parts including an adjustable clamp or vise assembly A, a rotatable circular track assembly C, and an adjustable support means S. A powered cutting unit H is attached to the circular track assembly C as shown in FIGS. 2 and 3. A glass pipe or tube P is clamped by the vise assembly A and rests upon support means S. The clamp assembly A, circular track assembly C and support means S are suitably mounted on a platform or frame F which may be mounted on a table or legs 10 as shown in FIG. 2. A cutting slurry pan 12 may be attached to frame F to contain cutting slurry for recirculation and reuse.

Figure 1:
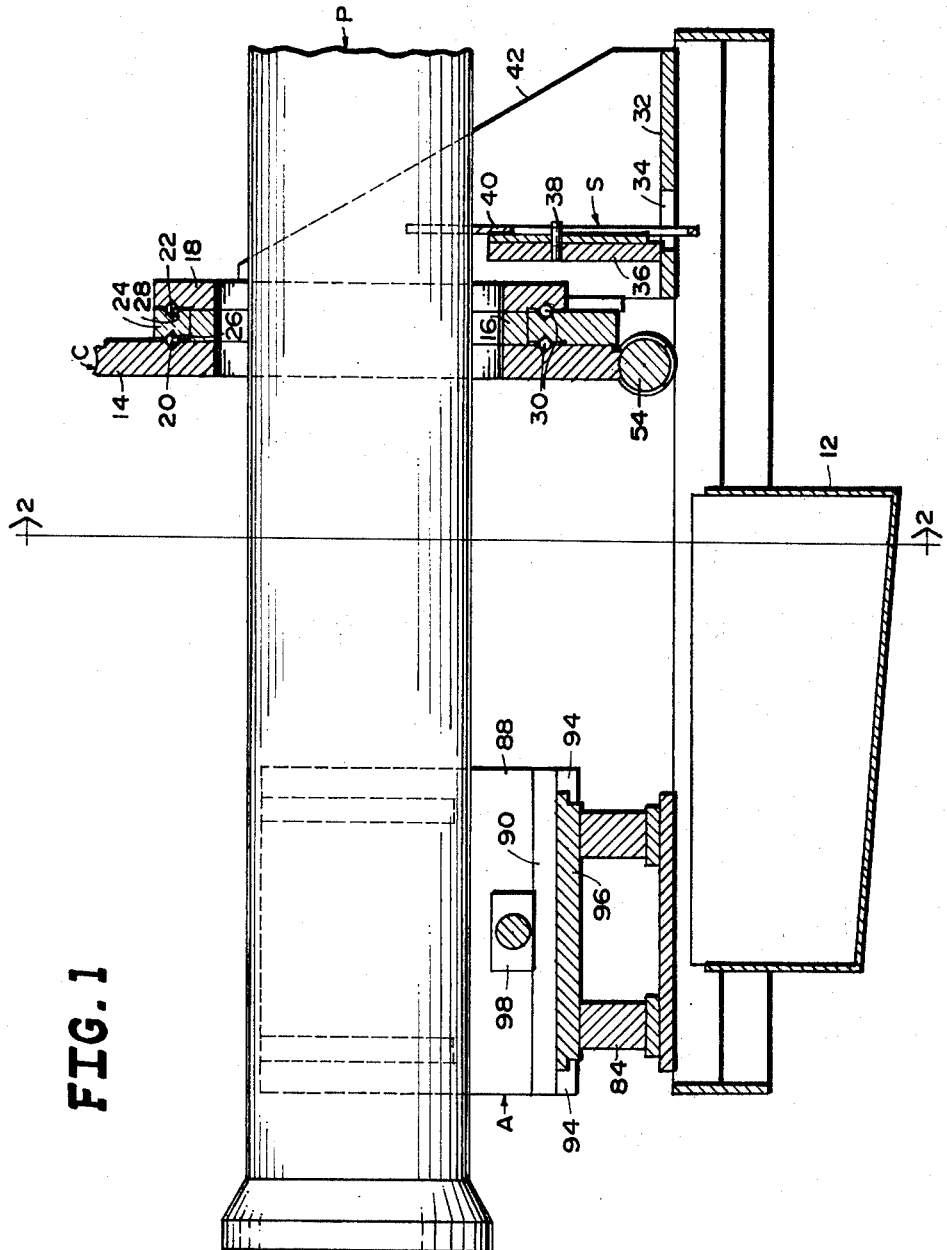

Referring now to FIG. 1, the rotatable circular track assembly C is shown comprising a worn gear 14, a spacer ring 16, and a retaining ring or bearing cap 18. The spacer ring 16 is suitably mounted between and relatively attached to the worm gear 14 and the bearing cap 18 to provide a unitized structure. The unitized structure has a centrally located axial hole or open portion formed therein of sufficient diameter to accommodate the pipe diameters to be cut. A circular V-groove 20 is formed in the inner surface of the worm gear 14 and a circular V-groove 22 is formed in the inner surface of the retaining ring 18.

A retainer plate 24 may be attached to support S, however, in a preferred embodiment supports 42 are attached to the retainer plate 24 and a base 32 which is attached to support S. The retainer plate 24 encircles spacer ring 16 and is positioned between worm gear 14 and retaining ring 18 for mounting the unitized gear 14, ring 16 and retaining ring 18 to the frame. Circular V-grooves 26 and 28 are formed in the left and right face respectively of retainer plate 24.

V-grooves 20, 26 and 22, 28 respectively provide ball races for a plurality of bearing balls 30 so that the unitized gear 14, ring 16 and cap 18 may rotate while being supported by plate 24. The rotatable circular track assembly is maintained in an approximate 90° relationship to the centerline of the pipe begin cut and concentric with said pipe.

The adjustable support means S is attached to the base 32 having a slot 34 formed therein. The base 32 is mounted to the platform F.

The means S comprises a V-plate support 36, having a plurality of adjusting pins 38 attached thereto, and is mounted in an approximately vertical position to base 32. A movable V-block or V-plate pipe rest 40, having slots formed therein, is slidably positioned adjacent the V-plate support 36 with the said slots traveling along and guided by the adjustment pins 38. The V-block 40 aids in supporting the pipe while it is being cut so that the longitudinal axis of the pipe is in substantially parallel relationship with the frame. This adjustable movement allows pipes of various diameters, such as pipe P, shown in solid lines, and pipe P' shown in broken lines, to be supported by V-block 40 as shown in FIG. 2. Once proper positionment for a given diameter pipe has been made, the V-block 40 may be semipermanently affixed to V-plate support 36 by any suitable holding means, such as an adjustable wing nut. The slot 34 is of such configuration and size that movable V-block 40 may pass within slot 34 when accommodating larger diameter pipe.

As shown in FIG. 2, a lead screw shaft or worm shaft 44 passes through a plurality of support blocks 46, 48, and 50 which mount the shaft 44 to the inventive device. The support blocks 48 and 50 may be attached to retainer plate 24, and support block 46 may be attached to the frame F. A lead screw wheel 52 is attached to the outer end of the lead screw shaft 44. A worm or lead screw 54 surrounds a portion of the lead screw shaft 44 and is attached thereto in the vicinity of its inner end. The worm 54 engages the teeth of worm gear 14 thus providing means for rotating the track assembly such that the rotation of lead screw wheel 52 causes a corresponding rotation of worm gear 14 and portions attached thereto.

Referring now to FIGS. 2 and 3 the powered cutting unit H is shown comprising a pivot bar 56 and a motor mount pivot or pivot stud 58 respectively attached to the exposed face of the worm gear 14. A motor mount 60 has a suitable motor 62 attached thereto. A collar or sleeve 64 is assembled to one end of the motor mount 60 and encircles pivot stud 58 for rotating the mount 60 about stud 58. A bifurcated portion 65 extends from the opposite end of the motor mount 60. Said bifurcated portion has a coaxially aligned bore formed through each portion. A mandrel support 66 is attached to motor mount 60 for mounting a rotatable mandrel 68 which has an abrasive cutting wheel 70 attached thereto. A belt 72 rides on a drive motor pulley attached to motor 62 and frictionally engages mandrel 68. When the motor is energized to rotate the drive motor pulley the mandrel 68 and the cutting wheel 70 rotate by means of the belt 72.

Figure 4:
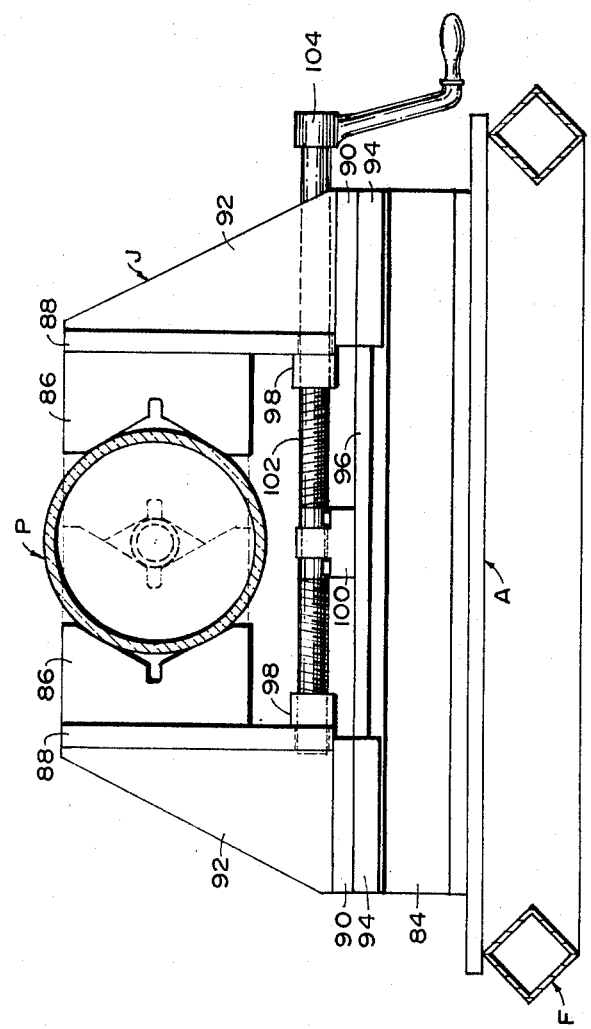
FIG. 4 is an end elevational view of the adjustable clamp assembly incorporated within my invention.
Figure 5:
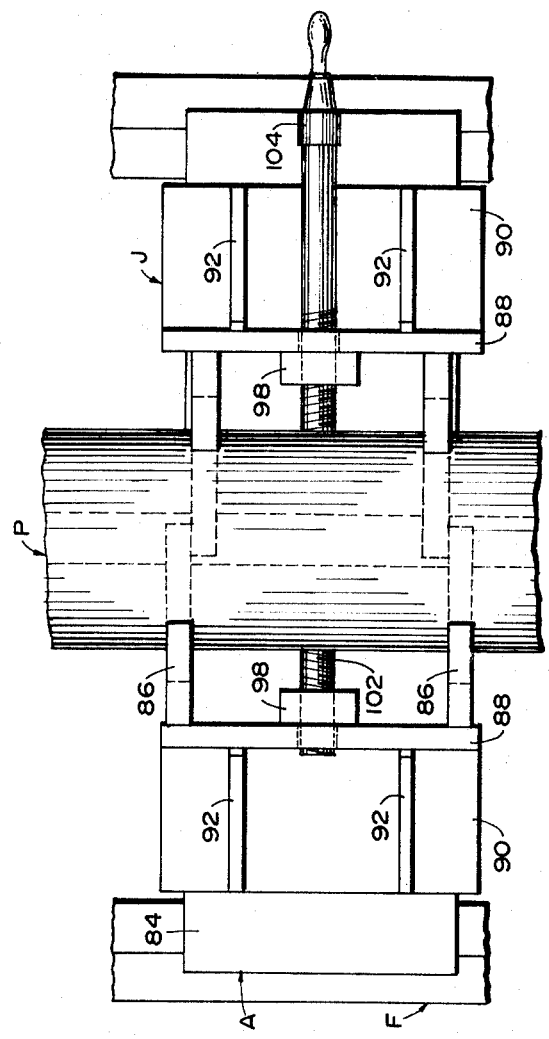
FIG. 5 is a plan view of the adjustable clamp assembly.

A jack screw 74 is threaded through pivot bar 56. In a preferred embodiment each end of jack screw 74 has a handle 76 and 78 respectively attached thereto. A pivot block 80, has a bore formed therein which is penetrated by the jack screw 74, and block 80 rests upon a shoulder formed on said screw 74 to prevent the block from sliding along the screw 74. A pair of axially aligned pins 82 are attached to pivot block 80 and extend therefrom in opposite directions. The pins 82 pass through and are rotatably maintained within the coaxially aligned bores formed in the bifurcated portion 65 of motor mount 60. The pins 82 are thus attached to motor mount 60 for pivotally supporting block 80 from the motor mount 60. As shown in FIG. 4, the adjustable clamp or vise assembly A comprises a clamp slide table 84 attached to platform F and a plurality of interacting jaw support assemblies J slidably attached to the table 84.

Right and left jaw support assemblies are of the same basic construction. Each assembly J has a plurality of laterally spaced jaws 86 for clamping a portion of pipe while it is being cut. The jaws are attached to jaw mount 88 which is attached to jaw base 90. A plurality of jaw supports 92 are attached to the jaw mount 88 and jaw base 90 to impart rigidity to the assembly. A plurality of facing jaw slides or gibs 94 (shown also in FIG. 1) are attached to the base 90 and engage a rail portion 96 of the clamp slide table 84 so that the jaw assemblies J may reciprocate along the slide table 84 to clamp various diameters of glass pipe P.

A threaded block or nut 98 is attached to the jaw mount 88 of each jaw support assembly J. A clamp screw retainer or bearing block 100 is attached to the approximate center of the top of the table 84. The block 100 has a bore formed therethrough and the said bore is coaxially aligned with the threaded portions of the nuts 98 of the pair of oppositely facing jaw assemblies J.

An oppositely threaded clamp lead screw, such as right and left thread screw 102, passes through and is retained and supported by the bearing block 100; and threads into the nuts 98 of the jaw clamp assemblies. A lead screw handle 104 is attached to one end of the screw 102 so that by turning the handle 104, the vise assembly A relatively opens and closes and clamps in the well-known manner a portion of the pipe being cut.

It thus can be seen that in carrying out the inventive concept, a length of glass pipe which is to be cut into shorter lengths is mounted between the vise assembly and the support means. By turning the handle 104, the vise assembly is caused to open and close and thereby to securely grip the length of pipe to be cut. The jaws grip and hold said pipe. By securely fastening the bearing block 100 to the slide table 84 and configuring the jaws in the shape of V-blocks, the central axis of the pipe will fall on approximately the same longitudinal axis for various diameters of pipe.

The means for supporting the pipe is vertically adjustable to support the pipe during the cutting operation and to aid in maintaining the central axis of the pipe at an approximately horizontal attitude with relation to the frame F. This support prevents any torque and strain from being induced into the pipe while it is being cut and promotes a smooth and finished cut.

In a preferred embodiment the rotatable circular track assembly is attached to the frame traversely of the longitudinal axis of the pipe and between the vise assembly and the support means.

The securely mounted retainer plate supports the united worm gear, spacer ring and bearing cap as previously described. The mounted pipe passes through the centrally located hole in the assembled gear, ring and cap so that the central axes of the pipe and the hole are approximately coincident. Circular V-grooves provide ball races for ball bearing so that the gear, ring and cap move as a unit around the retainer plate while being held by said plate in a position approximately 90° to the centerline of the mounted pipe and concentric with said pipe.

By turning the lead screw wheel 52, the worm 54 engages the teeth of worm gear 14 which is rotated thereby and circles the mounted pipe.

The motor is pivotally mounted to the exposed face of the worm gear so that the plane of the mount pivots adjacent said face about an axis perpendicular thereto. The rotatable mandrel has the abrasive cutting wheel mounted to it so that the said wheel is approximately at right angles to the centerline of the mounted pipe. Thus when the pipe is cut, a square, finished end is produced on the pipe.

The bifurcated portion of the pivoted mount is supported by the pivot bar 56 through the linkage of the jack screw, pivot block and pins 82. By turning either handle 76 or 78, the mount and attachments are pivoted and provide means for bringing the cutting wheel into engagement with the pipe and thereafter cutting said pipe.

When the motor is energized to rotate the drive motor pulley, the cutting wheel rotates by means of the mandrel being turned as the belt rides on the pulley.

Thus to circumferentially cut a mounted portion of pipe the motor is activated, causing the cutting wheel to rotate. It is preferred that a portion of the pipe is cut through first and then circumferentially cut. To accomplish this, either handle 76 or 78 is turned in a direction to bring the rotating cutting wheel into contact with the pipe. The handle is then further turned until the cutting wheel has cut through the entire thickness of the pipe at that point. Then by turning the lead screw wheel, the cutting process is continued in a circumferential manner by rotating the circular track assembly and the attached powered cutting unit in the method previously described until the entire cut has been made.

A coolant is preferably applied to the cutting wheel during the cutting process to lengthen the life of said wheel. The coolant may fall by gravity into the slurry pan provided herein for recirculation.

While the various illustrations and parts of this invention have been referred to as being located in an inner or outer, right or left, vertical or horizontal position and moving or positioned downwardly or upwardly and to the right or left, it will be understood that this is done solely for the purpose of facilitating description and such references relate only to the relative positions or movements of the parts as shown.

Although I have disclosed the now preferred embodiment of my invention it will be apparent to those skilled in the art that various changes and modifications may be made thereto without departing from the spirit and scope thereof as defined in the appended claims.

I claim:
1. Apparatus for circumferentially cutting a mounted length of pipe comprising, a longitudinal frame; a vise assembly, a rotatable circular track assembly, and adjustable support means mounted in spaced relationship on and in axial alignment along the longitudinal extent of said frame, with said rotatable circular track assembly intermediate said vise assembly and said adjustable support means; said vise assembly including a pair of longitudinally spaced-apart jaws on each side of a longitudinal axis passing through said vise assembly, rotatable circular track assembly and adjustable support means for gripping and holding a pipe to be cut along said axis; oppositely threaded lead screw means for maintaining the jaws on opposite sides of said longitudinal axis equally distant from such axis and for moving them in unison toward and away from each other; said rotatable circular track assembly having an open portion formed therethrough concentric with said longitudinal axis for receiving the pipe to be cut, power driven cutting means secured to said rotatable circular track assembly for rotational movement therewith about said open portion and the pipe therein, adjustment means for positioning said cutting means in operative cutting relationship with the pipe projecting through said open portion, screw means for rotating said rotatable circular track assembly and the cutting means thereon while in its operative cutting position; said adjustable support means having a V-plate pipe rest, and means for adjusting said pipe rest so as to support an end portion of the pipe to be cut substantially concentrically along said longitudinal axis.

2. Apparatus as defined in claim 1 wherein the pair of longitudinally spaced-apart jaws on one side of said longitudinal axis are within the longitudinal spacing of the pair of jaws on the opposite side of such axis such that the jaws on said one side may inwardly overlie the jaws on said opposite side when said jaws are moved in unison toward and away from each other.

3. Apparatus as defined in claim 1 wherein a slurry pan is attached to said frame for receiving cutting slurry for reuse.

References Cited
UNITED STATES PATENTS

| | | | |
|---|---|---|---|
| 231,181 | 8/1880 | Lewis | 269—272 X |
| 653,703 | 7/1900 | Scott | 51—90 |
| 961,969 | 6/1910 | Klingloff | 51—241 |
| 1,009,970 | 11/1911 | Hyle | 269—272 X |
| 1,617,364 | 2/1927 | Bacon | 269—272 X |
| 1,956,068 | 4/1934 | Herzog | 51—90 |
| 2,165,118 | 7/1939 | White | 51—90 X |
| 2,696,065 | 12/1954 | Harmes | 51—90 |
| 3,149,440 | 9/1964 | Maguire | 51—90 |

LESTER M. SWINGLE, *Primary Examiner.*

D. G. KELLY, *Assistant Examiner.*